US005267396A

United States Patent [19]

Wada et al.

[11] Patent Number: 5,267,396

[45] Date of Patent: Dec. 7, 1993

[54] PLUNGER LEAD MACHINING PROCESS FOR FUEL INJECTION PUMPS

[75] Inventors: Yukio Wada; Toshihiro Nakagawa, both of Saitama; Koiti Mori, Matsuyama, all of Japan

[73] Assignee: ZEXEL Corporation, Tokyo, Japan

[21] Appl. No.: 977,813

[22] Filed: Nov. 17, 1992

[30] Foreign Application Priority Data

Nov. 20, 1991 [JP] Japan .................................. 3-329740

[51] Int. Cl.[5] .............................................. B23P 15/00

[52] U.S. Cl. .............................. 29/888.04; 29/888.02; 29/890.128

[58] Field of Search ........... 29/888.04, 888.4, 890.128, 29/890.123, 888.02; 417/499; 123/506, 446, 445

[56] References Cited

U.S. PATENT DOCUMENTS

| | | | |
|---|---|---|---|
| 2,696,786 | 12/1954 | Fleck et al. | 417/499 |
| 3,123,006 | 3/1964 | Partridge | 417/499 |
| 3,833,988 | 9/1974 | Tobias | 29/890.132 |
| 3,930,482 | 1/1976 | Akashi et al. | 417/499 |
| 4,163,634 | 8/1979 | Powers | 417/499 |
| 4,490,098 | 12/1984 | Freudenschuss et al. | 417/499 |
| 4,591,321 | 5/1986 | Devaux | 123/447 |
| 4,951,372 | 8/1990 | Messingschlager | 29/890.132 |
| 5,135,367 | 8/1992 | Finsterwalder et al. | 417/499 |

FOREIGN PATENT DOCUMENTS

| | | | |
|---|---|---|---|
| 61-123756 | 6/1986 | Japan . | |
| 61-218769 | 9/1986 | Japan . | |
| 61-35727 | 10/1986 | Japan . | |
| 1-117981 | 5/1989 | Japan . | |
| 2152155 | 7/1985 | United Kingdom | 417/499 |

*Primary Examiner*—Irene Cuda
*Attorney, Agent, or Firm*—Nields & Lemack

[57] ABSTRACT

A process for machining a lead of a plunger to be used in a variable fuel injection rate type in-line fuel injection pump includes machining a plunger blank to form a port hole and then hardening. After this, the plunger blank is additionally machined, while being chucked by a NC machine, to form a shallow hole overlapping the lower end portion of the port hole. The plunger body is then machined in the chucked state with the machining reference of the shallow hole to form a longitudinal groove and a lead.

6 Claims, 4 Drawing Sheets

Fig. 6-A

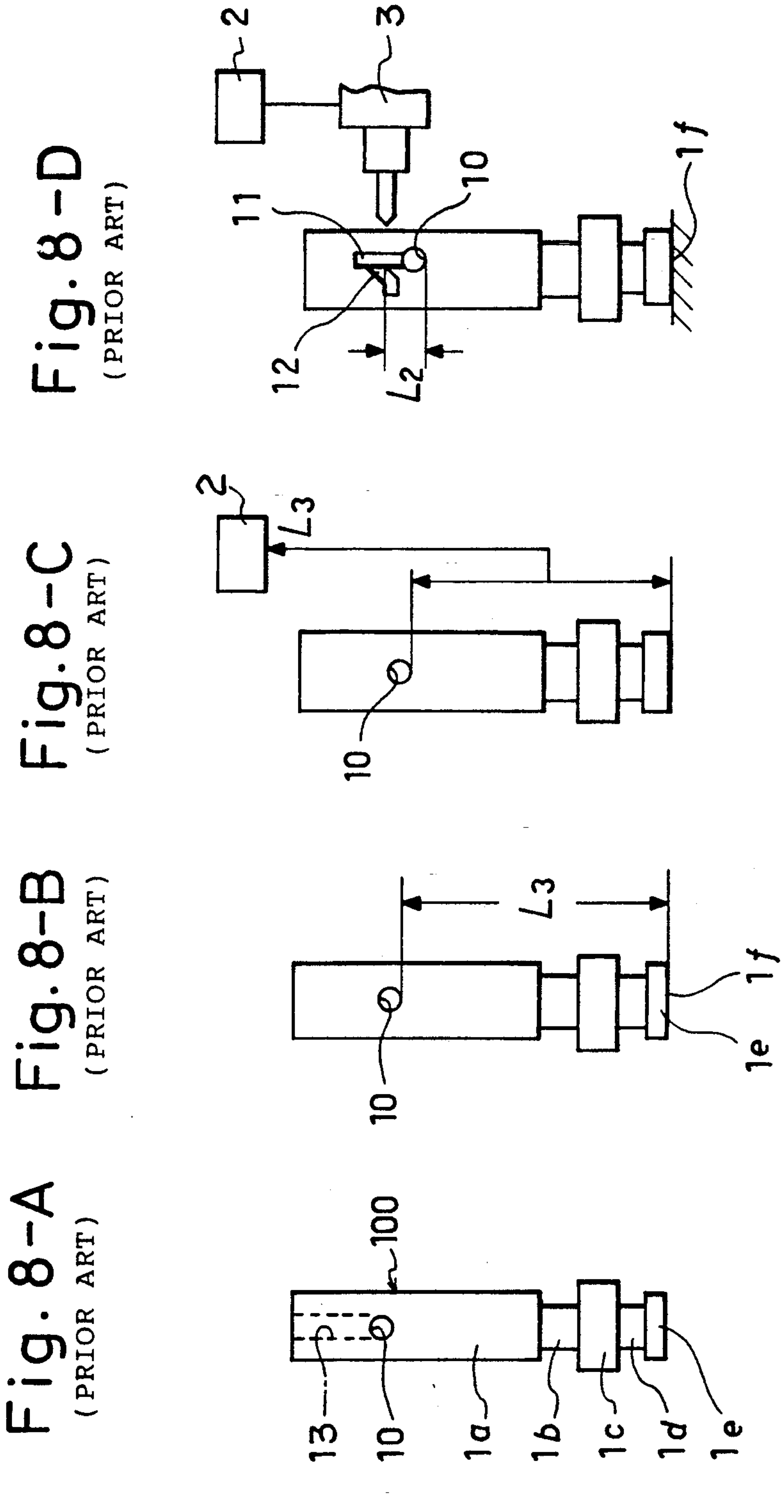
Fig. 8-D (PRIOR ART)
Fig. 8-C (PRIOR ART)
Fig. 8-B (PRIOR ART)
Fig. 8-A (PRIOR ART)

PLUNGER LEAD MACHINING PROCESS FOR FUEL INJECTION PUMPS

FIELD OF THE INVENTION

The present invention relates to a process for machining a lead of a plunger to be used in a fuel injection pump especially of the type having a variable fuel injection rate.

BACKGROUND OF THE INVENTION

A variable fuel injection rate type is known as one of the types of an in-line type fuel injection pump in a diesel engine. The fuel injection pump of this type has its plunger prestroke adjusted by changing the axial position of a control sleeve with respect to the plunger. This fuel injection pump is each of Japanese Patent Laid-Open Nos. 123756/1986 and 218769/1986, Japanese Utility Model Laid-Open No. 117981/1989, and Japanese Utility Model Publication No. 35727/1986.

More specifically, in the fuel injection pump of the aforementioned type, there is slidably arranged in a barrel a plunger, on which is fitted relatively movably a control sleeve. The plunger has its upper end facing an upper fuel compression chamber and formed at its center with an axial bore which extends in the axial direction. Moreover, the plunger is formed in its outer circumference with a longitudinal groove and a lead (i.e., inclined groove) intersecting with the former groove. This longitudinal groove has communication with the axial bore via a radial bore. On the other hand, the control sleeve is formed with a radial spill port.

In this fuel injection pump, no fuel is compressed for after the plunger begins its lift and before the longitudinal groove has its lower end edge shielded by the control sleeve. This time period is the "prestroke".

This prestroke can be changed by displacing the control sleeve in the axial direction of the plunger by the control rod. A time period after the prestroke and before communication between the lead and the spill port is the pumping effective stroke, for which the fuel is pumped. The pumping effective stroke can also be changed by turning the plunger relative to the control sleeve. On the other hand, if the lead and the spill port are aligned in the circumferential direction, there is established a non-injection state, in which the fuel is not compressed in the least by the plunger.

Because of the characteristics described above, the variable injection rate type fuel injection pump tends to be widely used. For expected effects, however, the position and size of the lead of the plunger have to be highly accurate. This high accuracy is difficult to achieve in the prior art.

Specifically, the ordinary in-line type fuel injection pump finds it relatively easy to reduce the dispersion of the fuel-pumping effective stroke because what the barrel undergoes is the vertical reciprocations of the plunger. In the variable injection type fuel injection pump, however, the control sleeve is moved up and down relative to the plunger. As a result, both the length from the lower end of the control sleeve to the edge of the spill port and the length $L_2$ from the lower end of a port hole 10 of a plunger 10, as shown in FIG. 7, to the branching starting portion of the lead are effective to cause the dispersion of the fuel-pumping effective stroke. Moreover, a longitudinal groove 11 and a lead 11 have to be formed not at the upper end of the plunger 1 but at predetermined lower distances than the upper end. Thus, the lead has found it so seriously difficult to machine in the normal position that its positioning accuracy has failed to improve.

More specifically, the plunger has a basic structure shown in FIG. 8-A by way of example. Below a plunger body 1*a* having a predetermined external diameter and across a neck portion 1*b*, there is formed a face portion 1*c*, below which is formed a bottom end 1*e* across a neck portion 1*d*. The bottom end 1*e* is in abutment against the not-shown cam through a tappet so that the plunger reciprocates along the contour of the cam. Incidentally, the face portion 1*c* is so engaged by an injection rate adjusting sleeve other than the aforementioned control sleeve that its turning motion is regulated by the adjusting sleeve.

In the prior art, the following process is taken for machining the plunger to form the aforementioned lead. A plunger blank 100, which has been worked to the state shown in FIG. 8-A (i.e., to the state at which it has not been hardened yet), is machined on the basis of information inputted in advance to an NC machine, to form both an axial bore 13 having a desired depth from the upper end face and a round port hole 10 in a predetermined circumferential position.

Then, the plunger blank 100 is hardened to have its hardness increased. After this hardening step, the length $L_3$ from the lower end of the port hole 10 to the bottom face 1*f* of the bottom end 1*e* is measured, as shown in FIG. 8-B, and is classified according to the difference from a reference size. This is because the hole position will disperse due to not only a machining error before the hardening step but also a deformation at the hardening step.

Next, the plunger blank 100 is chucked by the machine tool, and the programmed numerical value or coordinate of the length $L_3$ inputted in advance to a NC machine 2 is corrected according to the aforementioned classification, a shown in FIG. 8-C. As shown in FIG. 8-D, moreover, the machine body and its machining head 3 are moved relative to each other with reference to the machining reference plane of the bottom face 1*f* of the plunger bottom end in accordance with a control command having correcting program data, thereby to machine the longitudinal groove 11 and the lead 12.

According to this machining process, however, the machining reference is located at the plunger lower end (or its bottom face). Hence, the length $L_2$ (as will be called the "effective stroke size") from the lower end of the port hole 10 to the branching starting portion of the lead 12 will involve the dispersion of the length $L_3$ from the lower end of the port hole 10 to the bottom end face 1*f*. Even if, however, the length $L_3$ from the lower end of the port hole 10 to the bottom end face 1*f* is classified, the measurement itself of the length prior to the classification will involve minute errors. This makes it unavoidable to deteriorate the accuracy of the aforementioned effective stroke size $L_2$.

As a result, in the prior art, the effective strokes disperse so seriously among the plunger individuals that the individual engine cylinders have irregular fuel injection rates and timings. Thus, the expectations of the fuel injection pump such as improvements in the output power and the mileage and reductions in exhaust emissions are hardly achieved.

In the process of the prior art, moreover, many troubles and steps have to be involved for measuring the length $L_3$ from the lower end of the bottom hole 10 to the bottom end face 1*f*. Many steps also have to be involved for inputting different correction values to the NC machine in according to the classifications at the time of machining the lead. This makes it unavoidable to drop the machining efficiency as a whole.

SUMMARY OF THE INVENTION

An object of the present invention is to provide a process for machining the lead of a plunger of a variable fuel injection rate type fuel injection pump simply, efficiently and highly accurately.

In order to achieve the above-specified object, according to the present invention, there is provided a process for machining a plunger blank having a body, a neck portion, a face portion, a neck portion and a bottom end into a plunger to be used in a variable fuel injection rate type in-lie fuel injection pump, which process comprises: a first step of machining both an axial bore in the body of the plunger blank which is not hardened yet, from the upper end face of the same and a port hole in a predetermined position of the outer circumference of the body, and then hardening the plunger blank to enhance the hardness; a second step of additionally machining a shallow hole while overlapping the lower end of said port hole, by fixing the hardened plunger blank in an NC machine and by cutting said body with a cutting tool; and a third step of machining both a longitudinal groove in the outer circumference of said body with the machining reference of said shallow hole while holding the fixed state of said second step and a lead from a predetermined point of the longitudinal groove with the machining reference of said shallow groove, to set an effective stroke size.

Thus, the dispersion of the effective stroke size is not influenced by the dispersion of the port hole position, if any due to the deformation of the hardening step, so that it is remarkably reduced. As a result, the injections are sharpened to reduce the exhaust emissions. Less dispersions are caused at the beginning and end of injections of each cylinder. Thus, the variable fuel injection rate type fuel injection system can sufficiently exhibit its advantages including the improvements in the output power and the mileage and in the reduction of the exhaust emissions.

On the other hand, the lead is machined with reference to a slight slot by forming the slot in the port hole which has been machined in advanced before the hardening step. Both of these slot and lead are machined while the plunger blank is being chucked (in one chucked state) by the machine. Thus, it is possible to omit all the complicated steps such as the measurement of the distance from the bottom end to the port hole, the classification based upon the measurement result and the correction of the NC program. As a result, it is possible to improve the production efficiency and the working efficiency remarkably. Moreover, the flow beginning and end states of the fuel can be smoothed by machining the shallow hole in addition to the port hole.

BRIEF DESCRIPTION OF THE DRAWINGS

FIG. 6-A is an enlarged section of FIG. 6;

FIGS. 8-A to 8-D are explanatory diagrams showing the steps of the process for machining the lead for the variable injection rate type fuel injection pump of the prior art.

DESCRIPTION OF THE PREFERRED EMBODIMENTS

The present invention will be specifically described in the following with reference to the accompanying drawings.

Figure 1:
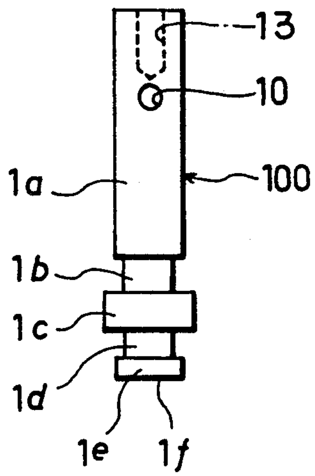
FIG. 1 is an explanatory diagram showing a first step of the process for machining a lead of a plunger for a fuel injection pump according to the present invention.
Figure 2:
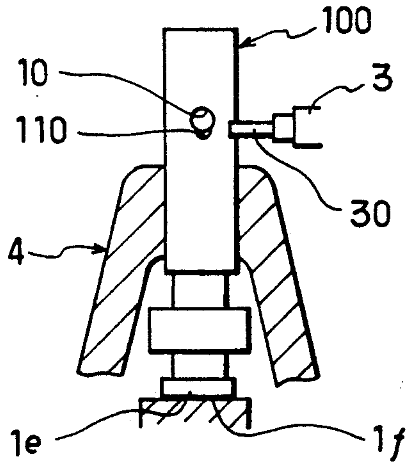
FIG. 2 is an explanatory diagram showing a second step of the present invention.
Figure 3:
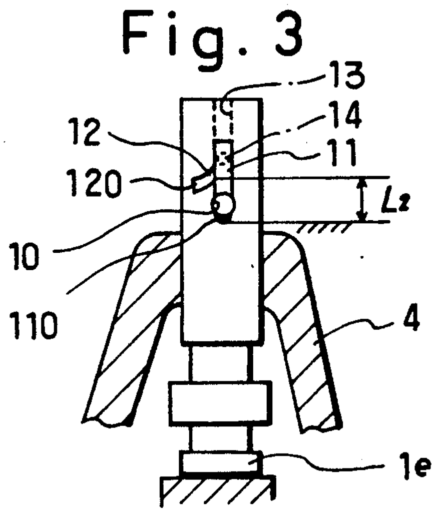
FIG. 3 is an explanatory diagram showing a third step of the present invention.

FIGS. 1 to 3 schematically show a plunger lead machining process according to the present invention.

First of all, a raw material is machined to prepare a plunger blank 100 having a body 1*a*, a neck portion 1*b*, a face portion 1*c*, a neck portion 1*d* and a bottom end 1*e*, as shown in FIG. 1. This machining process may be identical to that of the prior art. Specifically, the machining command data are prepared by making a program from the drawing and are encoded and read by the reader of an NC machine. This NC machine is used to perform the cutting operation.

At a first step, the plunger blank 100 thus prepared is bored with a port hole 10 in a predetermined position of its outer circumference and with an axial bore 13 from the upper end face of its body. Then, the plunger blank 100 is removed from the NC cutting machine and is hardened to have its entire hardness enhanced. The process till this step is identical to that of the prior art. The port hole 10 of this embodiment is made blind.

Then, at a second step, the hardened plunger blank 100 is attached to the spindle end 4 of an NC machine such as an NC grinder, as shown in FIG. 2, and is additionally machined in a chucked state to form a shallow hole 110 which overlaps the lower end of the aforementioned port hole 10.

Figure 4:
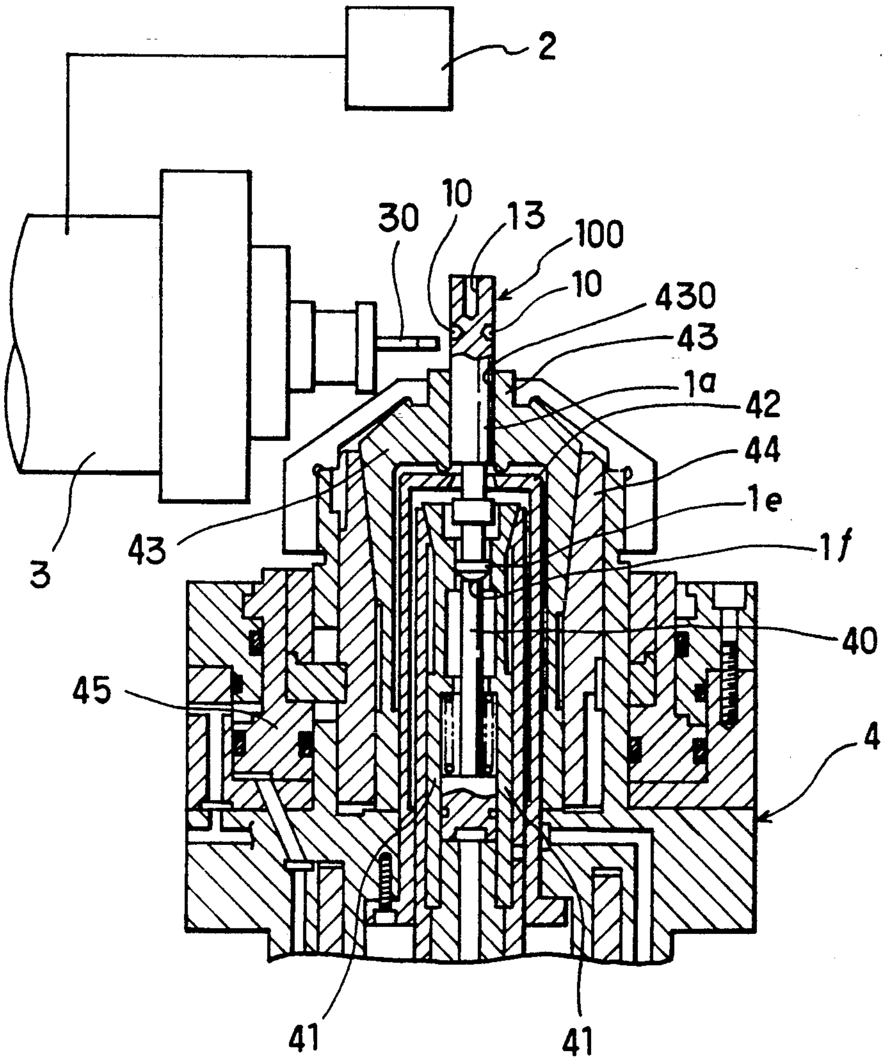
FIG. 4 is a section showing the detail of the second step of the present invention.

FIG. 4 shows the spindle end 4 and the machining state in detail. Outside of an inner chuck 41 having a positioning rod 40 fitted axially movably therein, there is arranged through a guide sleeve 42 a three-split outer chuck 43, which is fastened by a fastening sleeve 4 to be moved by a hydraulic actuator 45. The spindle end 4 is made rotatable. Reference numeral 3 designates a machining head which is carried by a cutter carriage and equipped at its leading end with a cutter (e.g., a grind stone or a cutting tool) 30. The machining head 3 is moved in the axial directions and in the radial directions.

At this second step, the aforementioned hardened plunger blank 100 is supported to have the bottom face 1*f* of its bottom end 1*e* abutting against the upper end of the positioning rod 40. The inner chuck 41 is fastened to chuck the circumference of the bottom end 1*e*. Then, the fastening sleeve 44 is actuated by the actuator 45 to shrink the outer chuck 43 radially. As a result, the outer chuck 43 chucks the body 1*a* on its inner wall 430 so that the plunger blank 100 is firmly held and fixed in an upright position.

Figure 5:
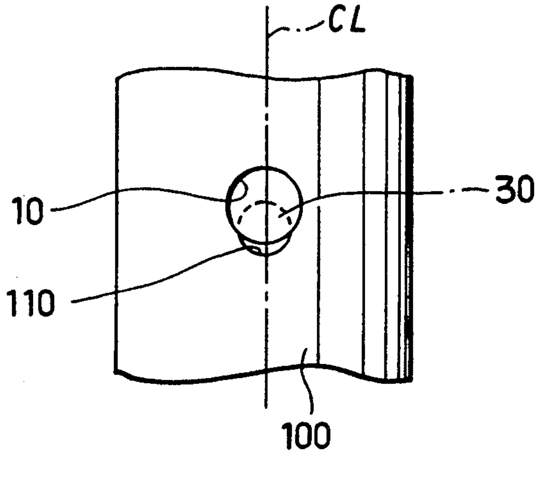
FIG. 5 is a front elevation showing a portion of a plunger blank at the second step of the present invention.
Figure 6:
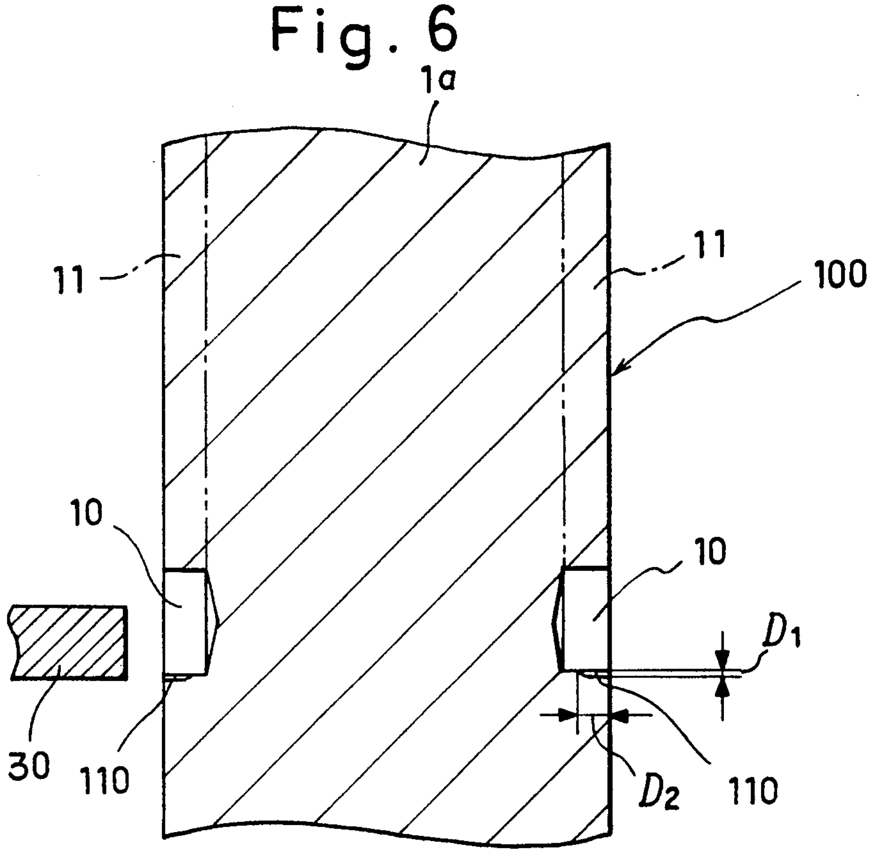
FIG. 6 is an enlarged section showing the same portion.
Figure 6:
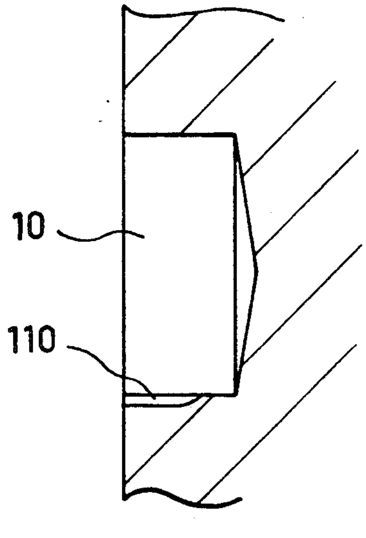

In this state, the bottom face 1*f* of the bottom end 1*e* is positioned to provide a virtual reference. Then, the cutter 30 is brought close to the plunger blank 100 to slot the lower end of the port hole 10. As a result, the shallow hole 110 is machined. In this state, as shown in FIG. 5 and FIGS. 6 and 6-A, the shallow hole 110 is formed into a crescent shape having a smaller curvature than that of the port hole 10 and its lowermost point located on the longitudinal center line CL of the port hole 10. As a result, the combined shape of the port hole 10 and the shallow hole 110 exhibits a shape similar to a keyhole in a front elevation. The shallow hole 110 has its axial leading and merging smoothly into the inner wall of the port hole 10 along an arcuate or straight line.

The shallow 110 is meant to have a smaller depth than that of the port hole 10. The size of the shallow hole 110 is unable to function as an effective machining reference point and difficult to machine, if it is too small. If too large, however, the shallow hole 110 may possibly affect the fuel flow adversely. Generally speaking, therefore, the size (i.e., the radial depth) $D_1$ of the shallow hole 110 from the lower end of the port hole 10 to the lowermost point of the arc is desired to fall within a range of 1/20 to 1/50 of the diameter of the port hole 10, as shown in FIG. 6. Moreover, the axial size (i.e., the axial depth) of the shallow hole 110 from the entrance of the port hole 10 is desired to fall within a range of ⅓ to 5/6 of the depth of the port hole 10, if this hole 10 is blind.

When the second step is thus ended, the spindle and the machining head 3 are relatively controlled, while the chucked state of FIG. 4 being held, to machine a longitudinal groove 11 having a predetermined length with the cutter 30 with reference of the lower end edge of the shallow hole 110. The longitudinal groove 11 is indicated by phantom lines in FIG. 6. Subsequently, a lead 12 having a predetermined length from a predetermined point of the longitudinal groove 11 with reference to the machining reference point of the lower end edge of the shallow hole 110. FIG. 3 shows the state in which this machining operation is completed.

In this embodiment, a second lead 120 angularly displaced is machined subsequent to the foregoing lead 12. Then, a radial bore 14 extending through the body 1*a* is bored in the longitudinal groove 11 above the lead branching position.

Figure 7:
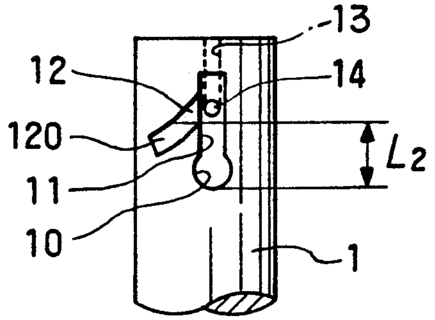
FIG. 7 is a front elevation showing a portion of a plunger for a variable fuel injection rate type fuel injection pump.

Thus, the lead machining operation is ended. The size required to be functionally accurate is the length $L_2$, as shown in FIGS. 3 and 7, but the size from the lower end edge of the shallow hole 110 to the bottom face 1*f* of the bottom end 1*e* may disperse. This is because, the latter size can be adjusted by means of a shim when the fuel injection pump is adjusted.

Since the port hole 10 is blind in the present embodiment, the radial bore 14 leading to the longitudinal bore 13 is formed close to the upper end of the longitudinal groove 11. However, this mode of embodiment should not limit the present invention. Depending upon the plunger diameter, the dead volume and the plunger strength, the port hole 10 may be modified, as in FIG. 8, into a through bore which is reached by the axial bore 13. Moreover, the radial bore 14 may be formed at the first step.

EXAMPLE

An embodiment of the present invention will be described in the following.

A rod made of high-carbon chromium bearing steel and having a diameter of 15 mm was machined to prepare a plunger blank. In accordance with an NC program, the plunger blank was machined to form an axial bore having a diameter of 3.5 mm and a depth of 2.6 mm from the top face and a port hole having a diameter of 3.5 mm and a substantial depth of 1.5 mm in a position at a distance of 64 mm from the bottom end. The plunger blank thus prepared was hardened to have a hardness of HRC63.

After this hardening treatment, the plunger blank was chucked by the spindle end of a vertical NC grinding machine, as shown in FIG. 4, to slot a shallow hole at the lower edge of the port hole. The cutter used was an electrodeposited grinding wheel having a diameter of 2.5 mm and was fed by 0.6 mm at a speed of 10 mml/min. The shallow hole had a crescent shape, as viewed in front elevation, and had a depth $D_2$ of 1.0 mm, as taken in the axial direction of the port hole, and a radial depth $D_1$ of 0.1 mm, as taken from the lower end of the port hole.

Subsequently, the spindle end and the cutter carriage were controlled with the machining reference point of the lower end of the shallow hole to machine a longitudinal groove having a width of 3 mm, a cut of 1.5 mm and a length of 13 mm and then to machine a first lead having an angle of 40 degrees, a width 3 mm and a length of 8 mm and a second lead having an angle of 52 degrees, a width of 3 mm and a length of 3 mm in accordance with the program. One hundreds of plungers were manufactured by the process thus far described.

For comparison, one hundreds of plunger blanks prepared under the identical conditions till the hardening treatment were individually measured as to the size from the bottom end to the lower end of the port hole and classified for every 10 microns to correct the NC program. With the machining reference of the bottom face of the bottom end, the longitudinal grooves and the leads were machined. One hundreds of plungers were manufactured by the process described above.

The results of measuring the plungers of the present invention and the comparison process have revealed that the dispersion of the effective stroke size $L_2$ was 50 microns on average in case of the comparison process. In case of the present invention, on the other hand, the dispersion was 10 microns on average, which was an drastic improvement over that of the comparison process.

Other results of comparing the time periods required till the end of the lead machining operation after the hardening treatment have revealed that the present invention had a value of 30 for a value of 100 of the comparison process. In this aspect, too, the productivity was drastically improved.

What is claimed is:

1. A process for machining a plunger blank 100 having a body 1*a*, a first neck portion 1*b*, a face portion 1*c*, a second neck portion 1*d* and a bottom end 1*e* into a plunger to be used in a variable fuel injection rate type in-line fuel injection pump, comprising:

a first step of machining both an axial bore 13 in the body 1*a* of the plunger bland 100, which is not hardened yet, from the upper end face of said body 1*a* and a port hole 10 in a predetermined position of the outer circumference of the body 1*a*, and then hardening the plunger blank 100 to enhance its hardness;

a second step of additionally machining a shallow hole 110 which overlaps the lower end of said port hole 10, by fixing the hardened plunger blank 100 in an NC machine and by cutting said body 1$a$ with a cutting tool 30; and a third step of machining both (a) a longitudinal groove 11 in the outer circumference of said body 1$a$ using said shallow hole 110 as a machining reference while holding the fixed state of said second step and (b) a lead 12 from a predetermined point of the longitudinal groove 11 using said shallow groove 110 as a machining reference, to set an effective stroke size $L_2$.

2. A process according to claim 1, wherein said port hole 10 is made blind whereas said shallow hole is slotted by means of a grinder or a cutting tool such that it is formed into a crescent shape having a smaller curvature than that of said port hole 10 and its lowermost point located on the longitudinal center line CL of said port hole 10.

3. A process according to claim 1 or 2, wherein said third step further machines a radial bore 14.

4. A process according to claim 1, wherein said port hole 10 extends through said body 1$a$.

5. A process according to claim 1, wherein said third step further machines a second lead 120 having a changed angle subsequent to said lead 12.

6. A process according to claim 1, wherein, at said second and third steps, said hardened plunger blank has its bottom end 1$e$ supported by the upper end of a positioning rod 40 of a spindle 4 of an NC machine and fixed at its side by an inner chuck 41 and has its body 1$a$ fixed by an outer chuck 43.

* * * * *